United States Patent [19]

Ducrocq

[11] 4,168,819
[45] Sep. 25, 1979

[54] ANTIVIBRATORY AND ANTI-SHOCK DEVICE FOR ATTACHMENT OF A SEAT SHELL FOR VEHICLES AND VIBRATING PLATFORMS

[75] Inventor: Julien Ducrocq, Chilly Mazarin, France

[73] Assignees: Societe Nationale des Poudres et Explosifs, Paris; Association d'Etudes pour les Applications des Oscillations Mecaniques, Antony, both of France

[21] Appl. No.: 803,538

[22] Filed: Jun. 6, 1977

[30] Foreign Application Priority Data

Jun. 29, 1976 [FR] France .............................. 76 19677

[51] Int. Cl.² ............................................ F16F 15/04
[52] U.S. Cl. .................................... 248/573; 248/595; 248/631
[58] Field of Search ................ 248/375, 376, 384, 400, 248/421, 358

[56] References Cited

U.S. PATENT DOCUMENTS

| | | | |
|---|---|---|---|
| 201,925 | 4/1878 | King ............................ 248/358 X |
| 598,186 | 2/1898 | Thompson ..................... 248/400 X |
| 1,211,077 | 1/1917 | Burton .............................. 248/8 |
| 1,295,059 | 2/1919 | Petterson ...................... 248/400 X |
| 1,898,444 | 2/1933 | Hawkins ....................... 248/421 X |
| 2,452,280 | 10/1948 | Zahller .......................... 248/399 |
| 2,533,573 | 12/1950 | Gabel ............................ 248/204 |
| 2,916,082 | 12/1959 | Wilkinson et al. ............... 248/376 |
| 2,968,483 | 1/1961 | Dodson ........................ 248/376 X |
| 3,070,342 | 12/1962 | Babbit ............................ 248/376 |
| 3,079,277 | 2/1963 | Painter ....................... 248/354 R X |
| 3,118,659 | 1/1964 | Paulsen ...................... 248/358 R X |
| 4,075,288 | 2/1978 | Graveron et al. ................. 260/879 |

OTHER PUBLICATIONS

Encyclopedie Internationale des Sciences et des Techniques, vol. 9, p. 522 (1973).
Encyclopedie Scientifique Ettechnique Lidis, vol. 4, p. 457 (1975).
Encyclopedie Scientifique et Technique, Lidis, vol. 1, pp. 123–125 (1973).
McGraw Hill, Encyclopedia of Science and Technology, vol. 14, pp. 316–319 (1960).
Encyclopedie International des Sciences et des Techniques, vol. 3, p. 242 (1960).

*Primary Examiner*—William H. Schultz
*Attorney, Agent, or Firm*—Bucknam and Archer

[57] ABSTRACT

A suspension device for supporting objects, such as a vehicle seat on a base to reduce vibrations transmitted from the base to a person seated on the seat, consists of a first lever hinged at one end to the base, and a second lever hinged to the other end of, and overlying the first lever, the first lever resting on the base, and the second lever resting on the base or the first lever, through respective gas-filled, bell-shaped, hollow damper studs.

11 Claims, 10 Drawing Figures

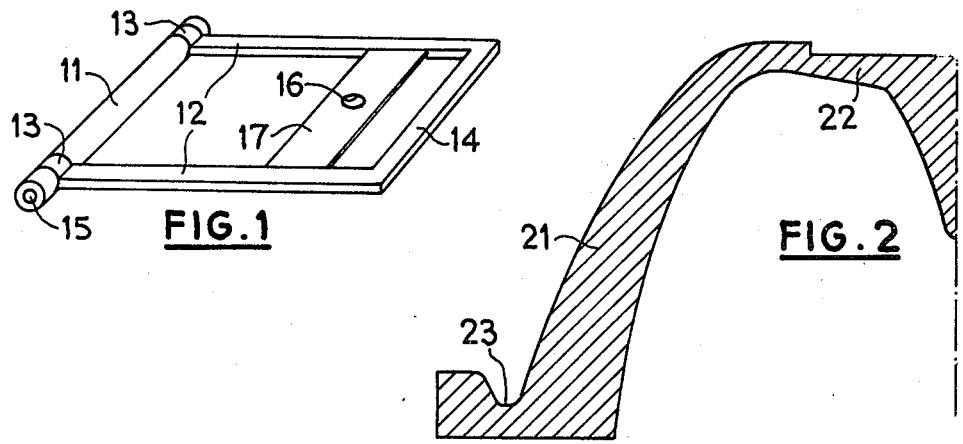
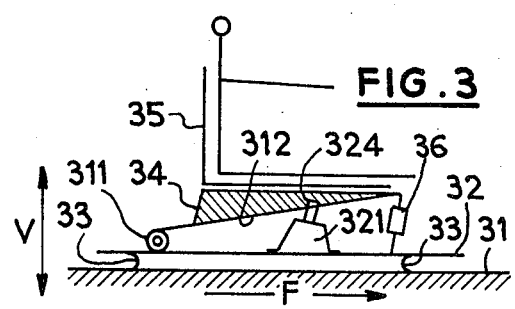
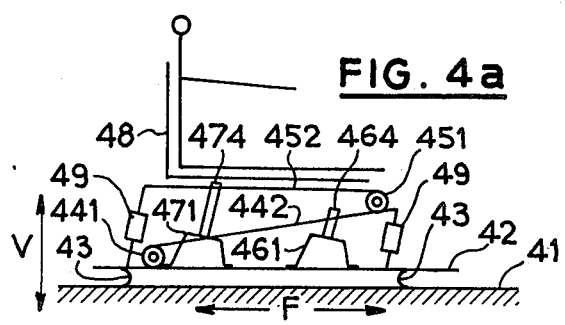
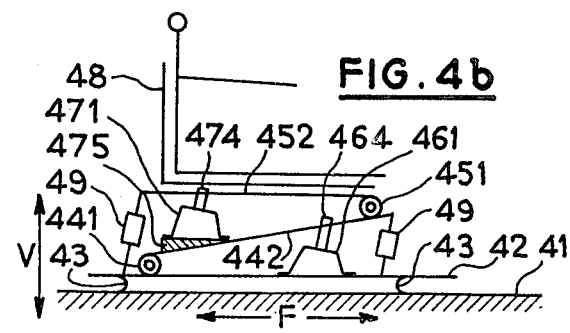

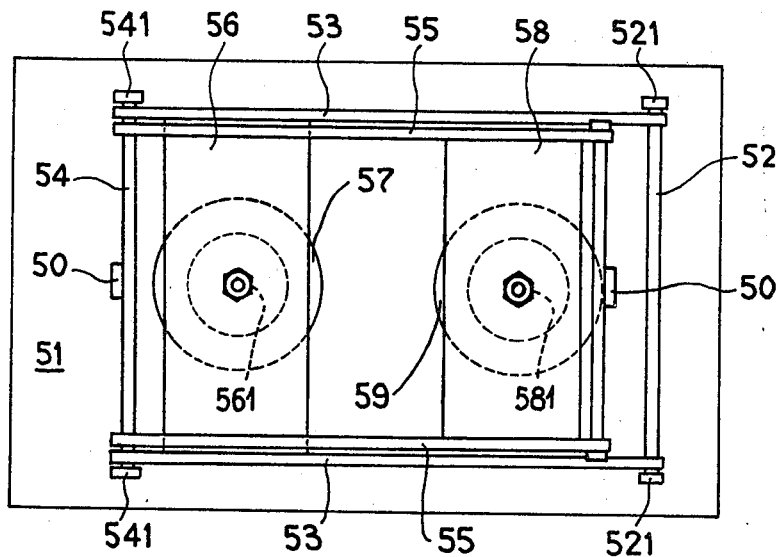
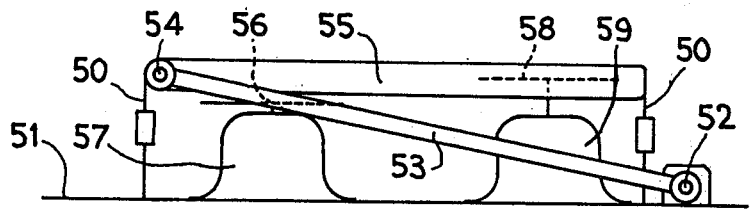
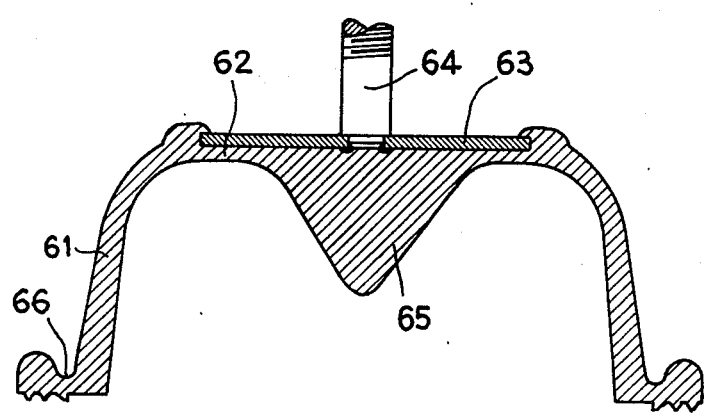

ANTIVIBRATORY AND ANTI-SHOCK DEVICE FOR ATTACHMENT OF A SEAT SHELL FOR VEHICLES AND VIBRATING PLATFORMS

The present invention refers to an antivibratory and antishock device for attachment of objects and especially of seat shells for vehicles and vibrating platforms.

Seats the shell of which—and in the present Patent by shell is to be understood the portion of the seat which is in direct contact with the body of the individual—is attached by rigid means to the base of a vehicle or a vibrating platform retransmit in their entirety to the individual seated on the seat the vibrations or the abrupt variations in energy to which the vehicle of the platform is subjected. The consequence is very great inconvenience to the person seated on such a seat. Thus persons seated on seats subjected to vibrations of high value either in frequency like helicopter pilots or in amplitude like lift truck drivers display after a few years irreversible deformations in the vertebral column. Furthermore it is known that the drivers or passengers in conventional vehicles are seriously affected by abrupt accelerations and decelerations of the vehicle and that the result can be in certain cases fatal accidents.

Attempts have been made to correct these disadvantages by designing systems of attachment of seat shells which are not rigid but flexible. Systems conceived of hitherto, such as those described, for example, in the French Patents Nos. 1 163 149, 1 281 760 and 88 801 consist essentially of springs sometimes supplemented by dampers, which are so-called linear mechanical systems, that is to say, their deformation is directly proportional to the stress that they undergo. The result is that if a system of attachment is required which is effective against vibration and shock, particularly at low frequency, springs of large dimensions must be employed, which leads to systems of attachement with large clearances and hence of great bulk, which cannot be employed in the majority of ordinary vehicles and platforms.

Systems of attachment of seat shells have then been conceived of in which the shell rests upon inflated pneumatic enclosures which act as dampers. Such systems are described, for example, in the French Patents Nos. 518 219, 2 224 678, in the Belgian Patent No. 389 289 or in the German Patent No. 1 273 344. In certain cases the inflated pneumatic enclosure is coupled to a mechanical system which necessitates a large clearance, such as is described, for example, in the French Patent No. 2 030 981. All these systems of attachment exhibit a bulk slightly less than that of the systems which make use of springs but which, however, remains large enough; further, adjustment is difficult.

It must likewise be noted that such systems act only upon vertical vibrations but are of no effect in respect of accelerations or decelerations due to changes in speed.

The object of the present invention is to provide a device for attachment of a seat shell to a base, which is of very small bulk so as to be employable in no matter what vehicle or platform and which significantly damps vibrations and at least decelerations. By "which significantly damps" is to be understood the fact that the device in accordance with the invention retransmits to the person seated on the seat shell less than half the energy transmitted by the vehicle or the platform because of vibrations or abrupt variations in speed.

The object of the invention is achieved by a device for attachment of objects and especially of seat shells to a base, which comprises at least one lever consisting of an arm the centre of rotation of which is located at one end of the said arm, the said lever being articulated to the base by its centre of rotation and at least one hollow damper stud attached to the base and upon which the said arm rests. The position of the point of support of the lever arm upon the said stud is chosen in each case as a function of the problem to be solved.

By base is to be understood either the floor itself of a vehicle or a platform or a rigid plane surface attached to this floor by means of attachment known to those skilled in the art, such, for example, as sliderails. The seat shell rests upon the arm of the lever.

FIG. 1 illustrates one embodiment of the invention.

FIG. 2 is a cross section of one half of a stud molded without any system of attachment for the lever.

FIG. 3 represents schematically the device according to the present invention mounted on a base.

FIG. 4a illustrates one embodiment of the invention according to which the stud upon which the arm of the second lever rests, is attached directly onto the base.

FIG. 4b illustrates another embodiment of the invention according to which the stud upon which the arm of the second lever rests is attached to the arm of the first lever.

FIG. 5a is a top plan view of one device of the present invention.

FIG. 5b is a front view of the device of FIG. 5a.

FIG. 6 is a cross section of one stud showing the walls of the stud wider at the bottom than at the top.

Figure 7:
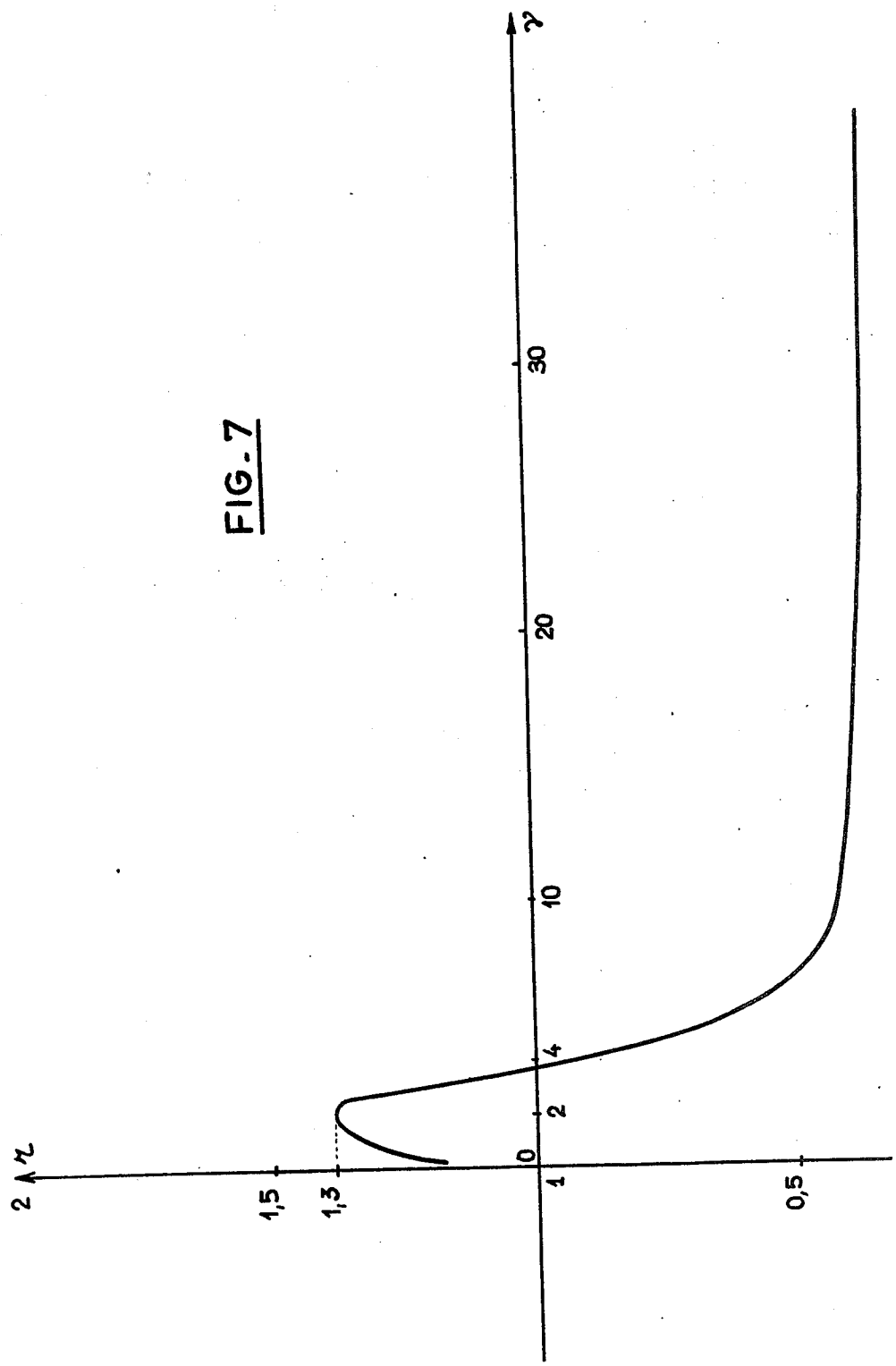
FIG. 7 represents the change of r, which is the ratio between the energy transmitted by the seat shell and the initial energy transmitted by the base, plotted on the axis of the ordinate and the frequency y plotted on the axis of the abscissa.
Figure 8:
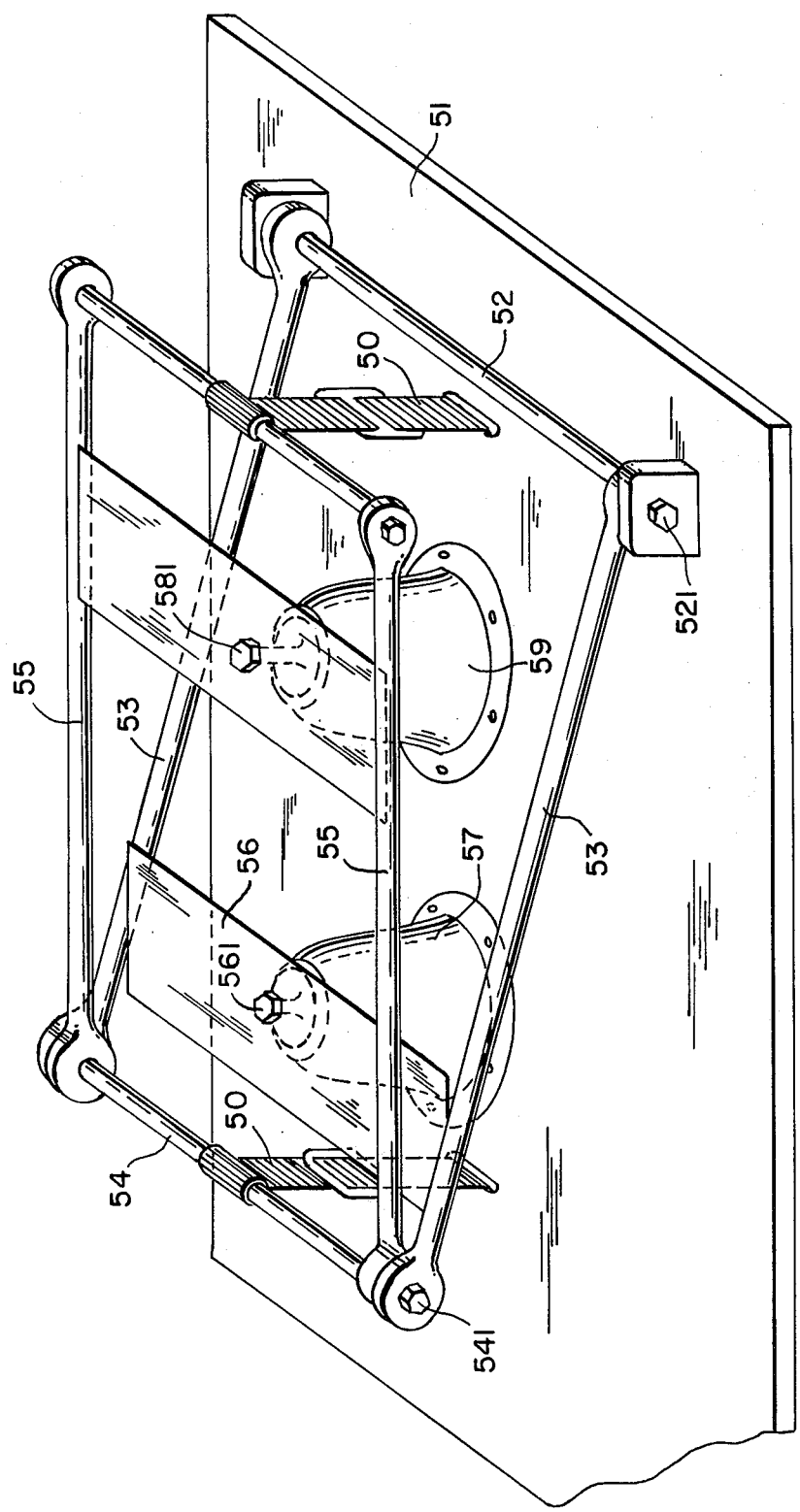
FIG. 8 is a perspective view of the embodiment of FIG. 5a and FIG. 5b.

In accordance with a preferred embodiment of the invention, represented in FIG. 1, the lever is hinged about a centre of rotation consisting of a cylindrical shaft 11 and includes an arm consisting of two rigid bars 12 which are free to rotate about the shaft 11 by means of the rotary collars 13 and are connected together rigidly by a bar 14. The ends 15 of the shaft 11 are advantageously hollow and threaded so as to to be able to be rendered integral with the base by screws. The lever is of a strong non-brittle material such, for example, as mild steel.

The hollow damper stud advantageously has a bell shape and consists of a viscoelastic material the Young's modulus of which at the temperature of use lies between $10^6$ and $10^9$ N/m$^2$ and the loss factor tg$\delta$ of which is greater than or equal to unity at the temperature of use that is between 0° and 40° C. Advantageously in accordance with the invention the damper materials are employed which have a base of polyisoprene as described in the French Patent Application No. 73.45839 which corresponds to U.S. application Ser. No. 531,326 filed Dec. 10, 1974 which has now issued as U.S. Pat. No. 4,075,288. The hollow stud which is attached flat onto a solid surface is filled internally with a gas or partly with an incompressible fluid such as water and partly with a gas.

When the studs are filled solely with a gas the filling pressure lies between about 50 millibars and one bar. The stud is moulded to provide for a system of attachment at the top of it, which will render it integral with the lever. A circular disc, for example, may be provided, which carries a threaded pin and will be attached to the top of the stud by moulding over it. By equipping the portions 12 of the lever by welding or any other means of attachment with a transverse plate 17, parallel with the bar 14 and provided with a hole 16, the lever may be rendered integral with the stud by means of a nut. In certain cases the bar 14 and the plate 17 may be merged.

FIG. 2 represents, seen in section, half of a stud moulded without any system of attachment for the lever. This Figure makes apparent an important characteristic of the invention. In the majority of cases it is of interest, although it is not a matter of a necessary characteristic, that the thickness of cross-section of the stud should not be constant and that it should vary in accordance with a law which confers upon it the best performance depending upon the problem to be solved. In this way a non-linear damping system is obtained which is capable of operating in a very wide field of frequency and amplitude and especially of reacting well to low frequencies. The flat 22 is useful for overmoulding onto the top of the stud the disc which carries a means of attachment intended to render the stud integral with the lever. The stud is attached to the base by conventional means such, for example, as a ring bearing in the recess 23 shown at the bottom of the stud, and screwed to the base.

FIG. 3 is a skeleton diagram showing the device in accordance with the invention mounted on a base and supporting a seat shell.

In this Figure the base 32 is shown attached by means 33 which may, for example, be sliderails, to the floor 31 of the vehicle or the platform. The shaft 311 of the lever may be seen, integration of which with the base has not been shown, also the arm 312 of the lever and the stud 321 integral by means 324 with the arm 312. The shell 35 rests by means of a wedge 34 upon the arm 312. Such a system damps the vertical vibrations V perpendicular to the floor 31 and in part absorbs by crushing of the stud 321 the frontal impulses F "towards the front" which in the absence of such a device, the occupant of the seat experiences at the time of high decelerations.

In accordance with a preferred embodiment of the invention, for safety purposes an adjustable flexible connection 36 is provided between the end of the arm 312 opposite from the centre of rotation, and the base 32. Such a connection is advantageously effected by means of a safety belt of the type of those employed for holding passengers in motorcars.

There will now be described a preferred version of embodiment of the invention. In accordance with this version the device for attachment of the seat shell to a base is composed of a lever consisting of an arm the centre of rotation of which is located at one end of the said arm, the said lever being hinged to the base by its centre of rotation, and of at least one hollow damper stud which is attached to the said base and upon which the said arm rests, to the end of the said arm opposite from the centre of rotation is attached the centre of rotation of a second lever similar to the first, the arm of the second lever being substantially superimposed upon the first lever so as to make with the arm of the first lever an acute angle, and resting upon at least one hollow damper stud distinct from the stud upon which the arm of the first lever rests. The two arms are constructed so as to be able to fit into one another in the event of considerable crushing of the device. In this version the seat shell rests upon the arm of the second lever. The damper stud upon which the arm of the second lever rests may be attached either directly to the base or to the arm of the first lever.

In this preferred version of the invention the levers and the damper studs are similar to those previously described, bearing in mind that the dimensions of the two lever arms are such that they can fit into one another. Likewise in certain cases the shaft of the second lever constitutes the bar 14 of the first lever.

FIG. 4a represents a first embodiment of the preferred version of the invention in which the stud upon which the arm of the second lever rests, is attached directly onto the base.

In this Figure are seen the floor 41, the base 42 connected to the floor by means of attachment 43. The shaft 441 of the first lever is attached to the base 42 by means not shown in the Figure, the arm 442 of this first lever is integral by means 464 with the stud 461 attached to the base 42. To the end of the arm 442 is attached the shaft 451 of the second lever, the arm 452 of this second lever is integral by means 474 with the stud 471 attached to the base 42. The arm 452 of the second lever supports the seat shell 48. Such a system damps the vertical vibrations V perpendicular to the floor 41 and in part absorbs by crushing of the studs 461 and 471 the frontal impulses F "towards the front" or "towards the rear" which the occupant of the seat experiences at the time of high decelerations or accelerations.

In accordance with a preferred variant, for safety purposes adjustable flexible connections 49 are provided at the ends of the arms 442 and/or 452 opposite from the centre of rotation, which connect these ends to the base 42. Such connections are advantageously effected by means of safety belts of the type of those employed for passengers in motorcars.

FIG. 4b represents a second embodiment of the preferred version of the invention in which the stud upon which the arm of the second lever rests is attached to the arm of the first lever.

In this Figure the references have the same numbering and the same meaning as in FIG. 4a. It will be noted that the stud 471 which is not obligatorily identical with the stud 461, rests on the arm 442 of the first lever, this being an arm upon which a system 475 has been provided, which enables the stud 471 to be laid on the flat.

This second embodiment displays substantially the same characteristics and advantages as the first embodiment of the preferred version of the invention.

In the detailed description which has just been given of different ways of putting the invention into effect, there have been described levers resting each upon one single damper stud, but each lever arm may rest upon a number of damper studs arranged either one after another in the direction of the length of the lever arm or one beside the other in the direction of the width, depending upon the particular problems to be solved in each case. Such solutions do not depart from the scope of the present invention.

It has even been indicated that the device in accordance with the invention is supporting a seat shell. That is its most frequent use, but this device can support any object which has to rest on a floor subjected to vibrations or movements and for which it is desirable to suppress to a large extent the vibrations or the effects of changes of speed transmitted by the said floor. Thus by way of example it is perfectly possible in ambulances or first aid vehicles to let the stretchers rest on devices in accordance with the invention so as to suppress for the injured person the detrimental effects from vibrations or abrupt braking of the vehicle. The device in accordance with the invention may equally well be used for the transport of fragile electronic material or for the suspension of the bodies of vehicles running on rails.

Depending upon the nature of the damper material which constitutes the studs and depending upon the characteristics of the levers and of the inflation of the said studs, a field of frequency is covered which starts at about 3 Hertz, which makes possible the employment of devices in accordance with the invention equally well for lift trucks or agricultural tractors, motor cars, aeroplanes, helicopters or platforms of machine tools.

This very much diversified use of the device in accordance with the invention is rendered all the easier that such a device exhibits very small bulk as is evidenced by the example below which illustrates a particular putting into effect of the invention.

EXAMPLE

In this example the embodiment of the invention as illustrated in FIG. 4a has been used.

The shell 48 is a seat shell for a lift truck driver. The floor is a vibrating platform resting upon an electromechanical simulator which enables there to be impressed upon the floor types of vibrations different in form, in frequency and in amplitude, starting at 0.1 Hertz, and which enables the vibrations to be simulated of either an agricultural tractor or a lift truck, or those of a helicopter.

FIG. 5a represents a plan of the device employed. In it are seen the base 51, the shaft of the first lever attached to the base by nuts 521, the bars 53 constituting the arms of the first lever and carrying at their ends the shaft 54 of the second lever attached by nuts 541 to the ends of the bars 53 and the bars 55 constituting the bars of the second lever. A plate 56 is welded to the bars 53, which bears at the centre of it a 10 mm hole and is made integral with the stud 57 by a nut 561. A plate 58 is welded to the bars 55, which bears at the centre of it a 10 mm hole and is made integral with the stud 59 by a nut 581.

FIG. 5b represents a front view of the device.

The general dimensions are given by the separate dimensions of the following different parts:

| Shaft 52 | length | 280 mm |
|---|---|---|
| | diameter | 25 mm |
| Bars 53 | length | 400 mm |
| Shaft 54 | length | 290 mm |
| | diameter | 35 mm |
| Bars 55 | length | 385 mm |
| Plate 56 | length | 230 mm |
| | width | 40 mm |
| Plate 58 | length | 180 mm |
| | width | 40 mm |

The two levers are of mild steel. The ends of the lever arms are connected to the base 51 by safety belts 50 stretched without load.

In this example the studs 57 and 59 are identical with one another. One of these studs is shown in FIG. 6.

In this Figure it may be noticed that the walls 61 of the stud are wider at the bottom than at the top.

The top 62 of the stud bears a flat which enables the seating by overmoulding, of a disc 63 onto which is welded a pin 64 of diameter 10 mm. A progressive damping stop 65 is included in the moulding of the stud in order to take the place of the said stud in the event of pressure failure or motion of very large amplitude. A recess 66 enables the stud to be attached to the base by means of a flange. The pin 64 by introduction into the central hole in the plates 56 and 58 and tightening of a nut enables integration of the levers with the studs to be ensured.

The studs exhibit the following dimensions:

| Wall 61 | Thickness at the bottom: | 7 mm |
|---|---|---|
| | Minimum thickness: | 3 mm |
| | Inside diameter at bottom: | 110 mm |
| | Maximum height inside: | 60 mm |
| Disc | Diameter: | 75 mm |
| | Thickness: | 2 mm |

The disc is of sheetsteel and the pin of mild steel.

The damper stud is of polyisoprene as described in the French Patent Application No. 73. 45839 which corresponds to U.S. Pat. No. 4,075,288 and exhibits the following physical characteristics:

| Young's Modulus: | $2 \times 10^7$ N/m$^2$ |
|---|---|
| tg∂ max: | 1.7 | between 0° and 20° C. for frequencies lying between 30 and 500 Hertz.

The studs are inflated with air at a pressure of 450 millibars. The lift truck driver's seat shell is attached to the arm of the second lever mounted as has just been described, the attachment device being mounted on a base connected to the floor of the platform by sliderails. By carrying out simulations of vibrations at various frequencies and recording the energy retransmitted to the seat it is found that the attachment device absorbs more than half the energy transmitted by the base beyond 3.8 Hz for this set-up. FIG. 7 represents as a function of the frequency γ the ratio r between the energy transmitted by the seat shell and the initial energy transmitted by the base. In order to carry out the measurements of these energies use is made of an accelerometer located on the base, an accelerometer located on the seat shell and a recorder apparatus connected to the two accelerometers. In this Figure it is to be noted:—on the one hand that starting from a frequency near to 4 Hz the device in accordance with the invention starts to absorb the energy, to be rapidly retransmitting only half of it,—on the other hand that at resonance the value "r" is about 1.3; this particularly low value is connected with the presence of the straps 50 which limit the amplitude of the vibrations at resonance.

I claim:

1. A suspension device for supporting an object on a base and to reduce vibrations transmitted from the base, having a reference surface, comprising first lever means having one end hinged to said base and an opposite end, a first hollow damper stud means on which said first level means rests at a position spaced from said one end towards said opposite end of said first lever means, second lever means having one end pivotally connected to said opposite end of said first lever means and a second end, flexible connection elements connecting to said base at least one of the ends of the first lever means and second lever means, said second lever means overlying said first lever means and an acute angle being defined between said first and second lever means, and a second hollow damper stud means on which said second lever means rests at a location spaced from said one end thereof, said second hollow damper stud means being in a predetermined fixed relationship with respect to said reference surface, wherein each of said first and second hollow damper stud means consists of a viscoelastic material which, at the temperature of the use of the device of 0°–40° C. has a Young's Modulus within the range of $10^6$ to $10^9$ N/m$^2$ and a loss factor tg$\delta$ not less than unity.

2. A suspension device as claimed in claim 1, wherein said second hollow damper stud means is attached to said base.

3. A suspension device as claimed in claim 1, wherein said second hollow damper stud means is attached to said first lever means.

4. A suspension device according to claim 1, wherein an adjustable, flexible connection element connects said second end of said second lever means to said base.

5. A suspension device as claimed in claim 4, wherein a further adjustable, flexible connection element connects said opposite end of said first lever means and said base.

6. A suspension device as claimed in claim 1, wherein said material has a polyisoprene base.

7. A suspension device as claimed in claim 1, wherein each of said damper stud means is filled with gas.

8. A suspension device as claimed in claim 7, wherein said gas is at a pressure within the range of 50 millibars to one bar.

9. A suspension device as claimed in claim 1, wherein each of said hollow damper stud means is filled partly with an incompressible fluid and partly with a gas.

10. A suspension device as claimed in claim 1, wherein each of said damper stud means has the shape of a bell.

11. A suspension device as claimed in claim 10, wherein the thickness of the bell wall is not constant and a progressive damping step is provided in the stud.

* * * * *